July 11, 1967      P. W. NICHOLS      3,330,523
MOTOR DRIVEN SEAT WITH MANUAL OVERRIDE
Filed July 15, 1965      4 Sheets-Sheet 1

INVENTOR.
PROCTOR W. NICHOLS
BY
Anderson, Spangler & Wymore
ATTORNEY

July 11, 1967 P. W. NICHOLS 3,330,523
MOTOR DRIVEN SEAT WITH MANUAL OVERRIDE
Filed July 15, 1965 4 Sheets-Sheet 2
*Fig. 2*
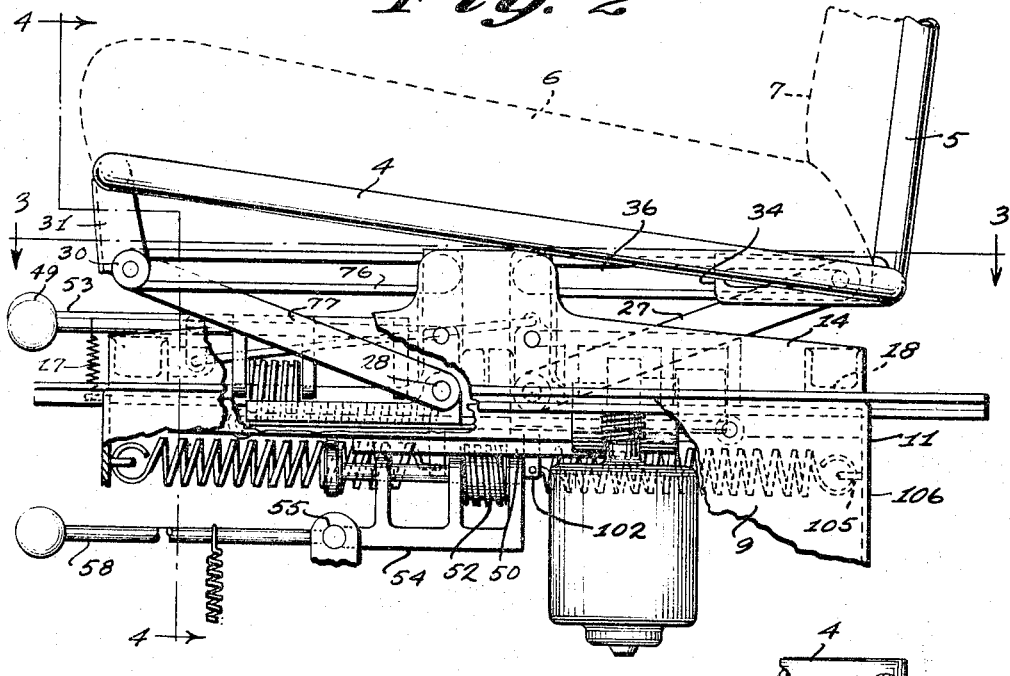
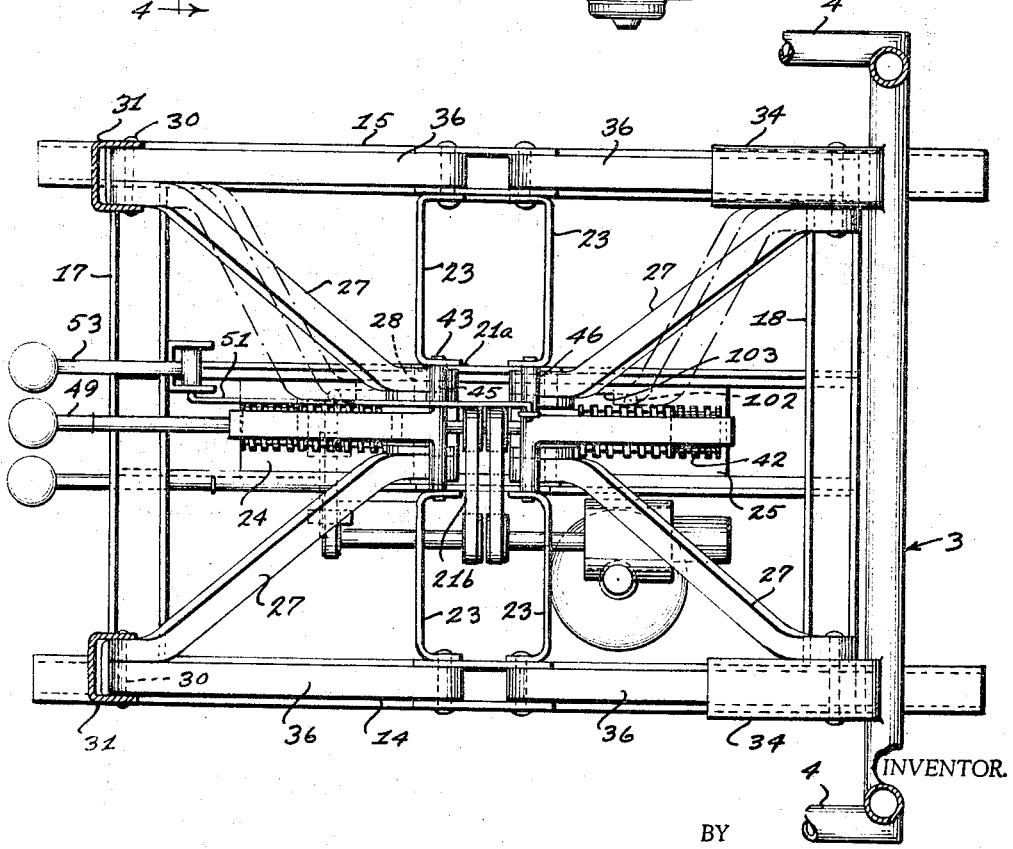
*Fig. 3*
INVENTOR.
BY PROCTOR W. NICHOLS
ATTORNEY July 11, 1967    P. W. NICHOLS    3,330,523
MOTOR DRIVEN SEAT WITH MANUAL OVERRIDE
Filed July 15, 1965    4 Sheets-Sheet 3

INVENTOR.
PROCTOR W. NICHOLS
BY
Anderson, Spangler & Wymore
ATTORNEY

July 11, 1967  P. W. NICHOLS  3,330,523
MOTOR DRIVEN SEAT WITH MANUAL OVERRIDE
Filed July 15, 1965  4 Sheets-Sheet 4
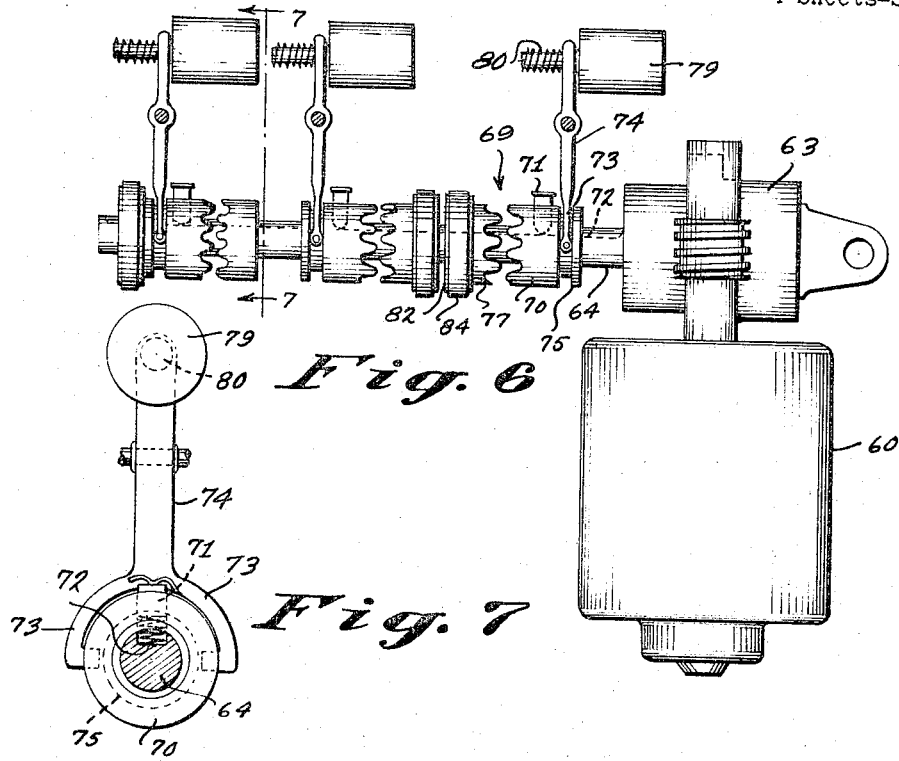
Fig. 6
Fig. 7
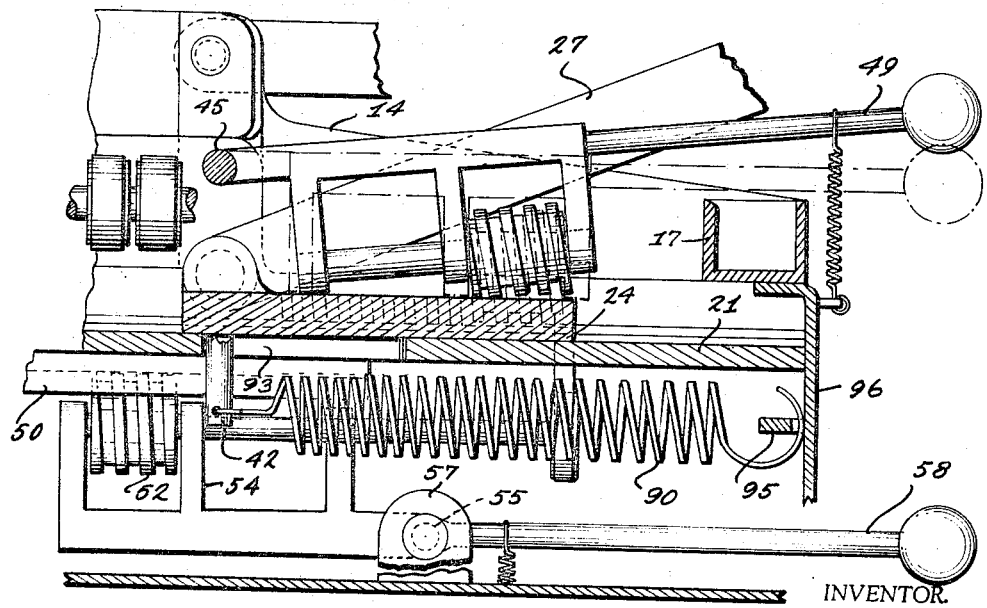
Fig. 8
INVENTOR.
PROCTOR W. NICHOLS
BY
Anderson, Spangler & Wymore
ATTORNEY

United States Patent Office 3,330,523
Patented July 11, 1967

3,330,523
MOTOR DRIVEN SEAT WITH MANUAL OVERRIDE
Proctor W. Nichols, El Paso County, Colo., assignor to Aircraft Mechanics, Inc., Colorado Springs, Colo., a corporation of Colorado
Filed July 15, 1965, Ser. No. 472,245
14 Claims. (Cl. 248—419)

The present invention relates generally to chairs and seats, and more specifically, to a seat having a motor actuated movable and tiltable bottom with means for manually overriding the motor driven actuator.

Motor actuated adjustable seats have been developed in various forms for vehicle and aircraft use and as such have been somewhat limited in their capacity for movement. My co-pending application, Ser. No. 452,271, is exemplary of an advance in the art which provides considerable latitude in positioning a seat, and which accommodates independent front and back tilt as well as vertical movement. With such selectivity of positions, all preferably obtained through the operation of an electric motor, consideration must be given to the possibility and consequences of motor malfunction. In high speed aircraft, where safety factors and reliability of equipment are of high importance, the problem becomes one of serious design consideration. The fact that a simple and foolproof system of motor override has not heretofore been developed has, in fact, discouraged the full use of the more sophisticated motor actuated adjustable seats which have been a part of the prior art, at least in the aircraft industry.

It is, therefore, the primary object of the present invention to provide a chair which will, with reasonable economy and efficiency, overcome the deficiencies of the prior art.

A second and more specific object of the invention is to provide a manual override mechanism for a motor actuated adjustable seat.

A further object of the invention is to provide an adjustable chair having independently variable forward and aft tilt.

Another object of the invention is to provide an adjustable chair of the type just described having powder driven means and manual control means which may be selectively engaged by the seat occupant.

Other and further more specific objects, features and advantages of the invention will be apparent from the following detailed description of a preferred form thereof which should be read in connection with the accompanying drawings in which:

FIGURE 2 is a side elevational view with portions broken away to more clearly reveal the details.

FIGURE 3 is a cross sectional view taken along lines 3—3 of FIGURE 2. Two of the supporting braces are shown in phantom representing their position when seat is fully elevated, both front and aft.

FIGURE 6 is a diagrammatic view of the motor drive system and solenoid operated clutches.

FIGURE 7 is an enlarged cross sectional view taken along lines 7—7 of FIGURE 6.

FIGURE 8 is an enlarged fragmentary view taken along lines 8—8 of FIGURE 4.

Concisely stated, the invention consists of improved means for adjusting the attitude and position of a chair which has a frame positioned over a base. The novel structure is disposed between the base and the chair frame and comprises screw operated jack means including a reciprocally movable actuator rack mounted on the base, a plurality of supporting members pivotally interconnecting the rack and the chair frame and worm drive means which may selectively be meshed for driving engagement with the rack. In order to provide for selectivity of driving engagement with the rack, the novel structure also includes a mounting for the worm drive means which is movably fastened to the base and is adapted to be raised and lowered into or out of engagement with the rack.

In addition to the aforesaid basic structure of the invention, novelty is also found in the concept of mounting a tension spring in operation parallel with the worm means, that is interconnecting the rack and the base, so that the force exerted by the spring may be utilized for manual adjustment of the chair.

Figure 1:
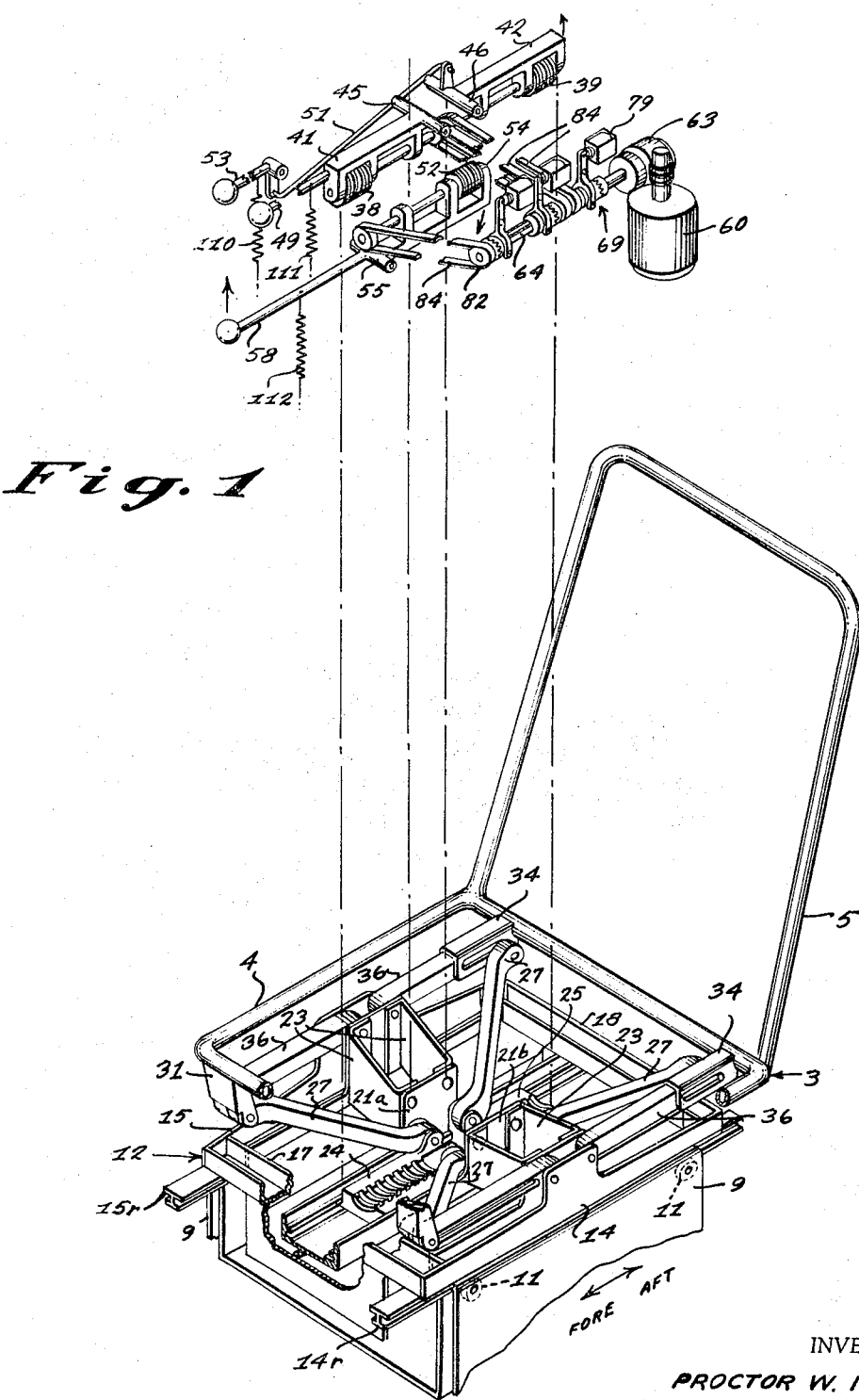
FIGURE 1 is an exploded perspective view of the adjustable chair construction of the present invention.

Referring now to the drawings for a detailed description of the preferred form of the invention where the adjustable chair is of the type designed primarily for use in aircraft and where the novel features of the inventions are employed to provide forward tilt, aft tilt, vertical motion and fore and aft travel, attention is first directed to FIGURE 1. The chair itself is not completely illustrated for sake of clarity, but is characterized only by its perimeter frame 3 of tubular metal construction and consists of a seat or bottom portion 4 and an attached backrest 5. The dotted outlines of seat and backrest cushions 6 and 7 respectively appear in FIGURE 2. For purposes of explanation, it will be assumed that the chair is carried by a platform 9 which may be a portion of the basic body structure of the aircraft, but in any case, is a fixed element with respect to the chair 3.

Figure 4:
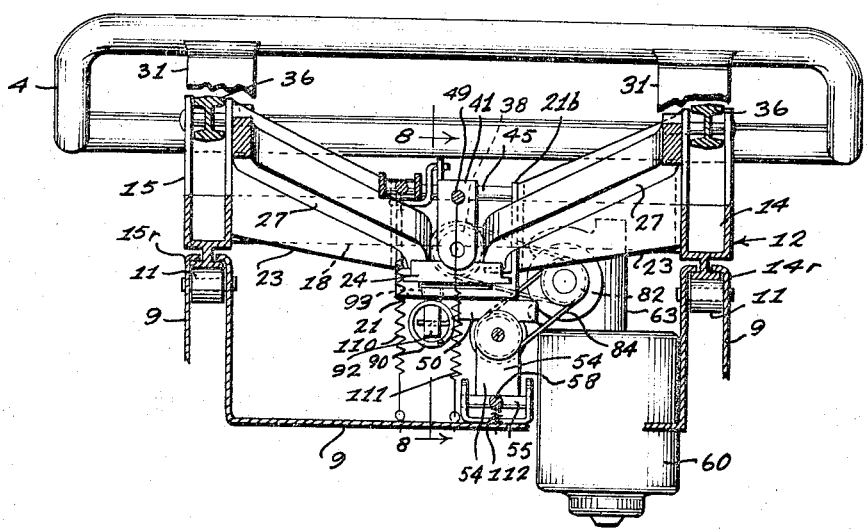
FIGURE 4 is a cross sectional view taken along lines 4—4 in FIGURE 2.

Mounted on each side of the platform 9 and journaled for rotation therein are a pair of spaced apart rollers 11 by which the base of the chair is supported for forward and aft travel. The base and its collective elements may be identified generally by reference numeral 12; however, it will be understood to include all separately identifiable parts which are rigidly interconnected to form the integral base structure. The frame of the base 12 consists of left and right parallel side channels 14 annd 15, held together by lateral front and back channel braces 17 and 18 forming a rectangle. The side channel extrusions are such that the bottom thereof also doubles as the top surface of an I beam extending forwardly and rearwardly of the lateral crossbraces 17 and 18 and forming a rail or track 14r and 15r in contact with the peripheral surface of the rollers 11, as seen most clearly in FIGURE 4.

Also included in the structure of the base is an elongated guide channel 21 disposed below the center line of the chair. The guide 21 is essentially U-shaped in cross section; however, the sides 21a and 21b thereof are more upwardly extended in the center of the guide than along the end portions thereof serving as means to fasten the guide 21 to the side channels 14 and 15 with spaced plates 23 welded or bolted therebetween.

Figure 5:
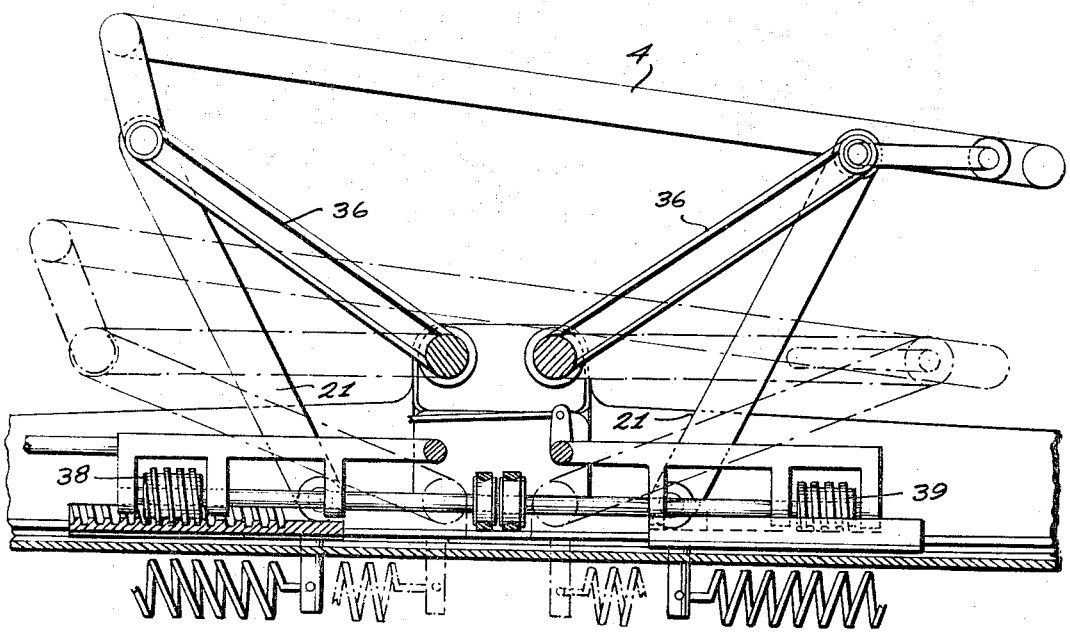
FIGURE 5 is a functional side elevational view of the supporting arms and braces in both extreme up and extreme down positions and showing the drive worms and racks for position reference.

Supporting the chair 3 on the base 12 is a screw jack system for elevating and lowering the chair including two reciprocally movable fore and aft actuators, preferably in the form of racks 24 and 25, and four supporting spider arms 27 pivotally interconnecting each of the said actuator racks and the frame 4 of the bottom of the chair 3. Two of the supporting arms 27 are connected by pins 28 to the forward rack 24 and to the seat frame 4 by a spindle pin 30 and a linkage 31. The rear pair of supporting arms 27 are pinned for pivotal movement to the rear rack 25 and to a slotted collar bracket 34 welded to each side of the seat frame 4. Additional lateral stability is obtained through the use of two pivotal braces 36 on each side of the chair 3 and its base 12 which are each disposed for vertical movement between the sides of each side channel member 14 and 15. It will be apparent to those familiar with machine elements and basic mechanics that as either of the racks 24 or 25 move along the guide 21 in which they are restrained for reciprocal travel, the bottom of the chair 3 will be elevated or lowered in accordance with the direction of travel of the respective racks. A functional and diagrammatic illustration of the motion and operation of the preferred jack system is depicted in FIGURE 5. It should also be apparent that forward tilt may be controlled by movement of the forward rack 24, while movement of the aft rack 25 will control the aft tilt of the bottom of the chair. Simultaneous movement of both will result in a change of seat elevation without effecting the angle of the seat 4. It is obvious that other mechanical arrangements utilizing the screw or worm and rack principle may be employed to raise and lower or tilt the seat without departing from the scope and teaching of this invention.

Reciprocal motion of the two racks 24 and 25 is provided by a worm or threaded screw 38 and 39 in meshing engagement with the threaded groove lengthwise of the racks. Each of the worms 38 and 39 respectively are journaled for rotation in bearing members 41 and 42, the latter of which are pivotally attached to the base 12 by spindles 43 and 44 extending through the raised middle portions 21a and 21b of the channel 21 and through bearing sleeves 45 and 46 which are integral with the worm bearing members 41 and 42. A handle 49 is secured directly to the forward bearing member 41 and provides a means to lift the worm 38 out of meshing engagement with the threaded groove of the forward actuator rack 24 (see FIGURE 8) in order to disengage the worm drive, the purpose of which has already been described in the introduction hereof. The aft worm 39 is provided with similar means for becoming disengaged except that a linkage 51 is necessary between the aft worm operating handle 53 and the aft worm bearing member 42 to achieve the proper direction of pivot about the axis formed by the holding pin 44 when the handle 53 is raised.

To move the chair 3 either forward or backward over the rail engaging rollers 11, a fore and aft operating rack 50 is rigidly fixed to the underside of the rack channel 21. It is similar to the previously described racks and has a longitudinal threaded groove adapted for meshing engagement with a threaded screw or drive worm 52 which is journaled for rotation in a bearing 54. The worm bearing 54 is similar to the forward tilt worm bearing 41, except the bearing sleeve 55 of the former is pivotally attached to a pair of support ears 57 welded to the platform 9. A handle 58, attached to the bearing 54, protrudes forward of the structure beneath the seat and serves as a means for disengaging the drive worm 52 from the threaded rack 50 to permit manual control of fore and aft travel. The placement of the fore and aft operating rack can be attached to the platform 9 if the worm drive mounting were attached to the base structure 12, it being understood that relative longitudinal movement between the rack and worm is the only requirement.

Each of the worm drives 38, 39 and 52 is driven from a common source of power, an electric motor 60, which is mounted on the platform 9. As best seen in FIGURES 1 and 6, the motor output shaft 61 drives the three separate worms 38, 39 and 52 through a system of belts and solenoid operated clutches so that each of the worms may be activated individually. A speed reduction gear box 63 meshes with the worm gear motor output shaft 61, to provide rotation for a drive shaft 64 on which the clutch elements are mounted. The clutches themselves are well known prior art devices and a detailed explanation is thought to be unnecessary; however, a brief description of one clutch will be made to explain them all since they are alike. Each clutch 69 includes a driving element 70 mounted on the shaft 64 and made to revolve with the shaft by a pin 71 which is set into a radial bore in the said clutch element and extends into a slot 72 in the shaft 64. The pin 71 is retained in the slot by the downward pressure of a leaf spring 76 which allows the pin to come out of the slot and relieve the clutch if the driven mechanism is allowed to drive to the limit of its travel. The bifurcated end arms 73 of a pivoted operating lever 74 ride in a peripheral groove 75 on the driven element and function to throw the clutch member into engagement with the driven element 77 of the clutch upon actuation of the solenoid 79 whose plunger 80 is connected to one end of the operating lever 74. The driven element 77 is freely rotatable on the gear box output shaft 64 and is provided with a sheave 82 around which is trained an endless belt 84. Each of the endless belts 84 is also placed in driving engagement with a drive shaft sheave 86, 87 and 88 connected with the three worms 38, 39 and 52 respectively. It will be understood that each of the clutch solenoids 79 is wired to a source of electrical power (not shown) and controlled by a separate switch to energize or de-energize the solenoid 79. By operating the solenoid control switches, the occupant of the chair may selectively engage any of the three seat controls and hold the switch in the ON position until the proper movement of the seat has taken place. Reverse direction of operation can be achieved by reversing the direction of motor rotation in a manner well known in the art.

As previously set forth in this description, the primary purpose of the invention is to provide means for manually overriding the motor drive mechanism of the adjustable chair in the event of motor drive malfunction. However, it will be apparent that if either the fore or aft tilt worm drives were to be suddenly disengaged from their respective racks while the seat was elevated, sudden and undesirable loss of seat elevation would occur. Moreover, an assisting device is necessary to elevate the seat when working under manual conditions. Therefore, to meet both of these requirements, a strong tension spring is attached in operational parallel to the motor driven adjustment means, that is to say, the tension force exerted by the spring tends to drive the racks to which they are attached to a position for elevating the chair 3. More specifically, a tension spring 90 is connected to the forward rack 24 by means of a post 92 attached to the rack and depending therefrom through a slot 93 in the bottom of the guide channel 91. The other end of the spring 90 is connected to an ear 95 integral with a depending front face plate 96 which is a part of the base 12.

Similarly, the aft rack spring 100 is attached to the aft rack 25 by means of a post 102 depending through a slot 103 in the guide channel 21. The other end of the spring 100 attaches to an ear 105 integral with a rear facing plate 106 which is also connected to and is a part of the base 12. Both springs 90 and 100 are of such strength that they will elevate the empty seat and will substantially maintain the elevated position thereof. The weight of an average seat occupant will not permit the spring force to adjust the seat or even maintain a given position; however, with a discrete amount of unweighting or slight bouncing on the seat, the occupant can easily position the seat to his satisfaction. It is contemplated that after a satisfactory manual adjustment has been made, the worm or worms which were disengged from their respective racks will once again be re-engaged by the use of the handles to lock the seat in position.

Each of the worm bearing member handles 49, 53, and 58 is held in the "down" position with tension springs 110, 111 and 112 respectively. Since there is little natural tendency for the worms to separate from the racks, the spring force need not be great and should not be such that the raising of the handles is rendered too difficult.

Having thus described the several useful and novel features of the motor driven seat with manual override of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. An adjustable seat of the type which is supported on a platform and the bottom of which is tiltable, including in combination;
   a seat frame;
   a base structure beneath the frame;
   a guide secured to the base;
   fore and aft actuators slidably disposed in said guide;
   a pair of supporting arms pivotally attached at their respective ends to the fore actuator and the front of the seat frame;
   a pair of supporting arms pivotally attached at their respective ends to the aft actuator and the back of the seat frame;
   first spring means interconnecting the fore actuator and the front of the base structure;
   second tension spring means interconnecting the aft actuator and the aft portion of the base structure; and
   separable locking means rigidly interconnecting the sliding actuators and the base.

2. In an adjustable seat, the combination comprising;
   a seat frame;
   a base;
   a straight horizontal guide attached to the base;
   fore and aft actuators slidably disposed in the guide for independent movement with respect to each other; and
   means interconnecting the actuators and the seat frame and responsive to the horizontal sliding movement of the actuators in said straight horizontal guide to move the seat frame vertically.

3. In an adjustable seat, the combination comprising;
   a seat frame;
   a base;
   a horizontal guide attached to the base;
   fore and aft actuators slidably disposed in the guide;
   spring means operatively connected to the actuators and urging said actuators to slide; and
   means connected to the said base and engageable with the said actuators to interfere with the spring urged sliding movement thereof.

4. In an adjustable seat, the combination comprising:
   a seat frame;
   a base;
   a guide attached to the base;
   at least one actuator slidably disposed in the guide;
   an electric motor having an output;
   a shaft having a helical thread thereon, said shaft being rotatable about its own axis and pivotal about a transverse axis, wherein the helically threaded shaft is pivotally mounted so as to be movable out of contact with the threaded portion of the actuator;
   clutch means interconnecting the motor and the said shaft; and said actuator having threads engageable with the threads of the said shaft whereby the actuator slides in response to rotation of the motor output.

5. The adjustable seat of claim 4 and further including spring means engaging said actuator and urging the actuator to slide.

6. An adjustable chair comprising;
   a seat frame having a bottom;
   a base;
   a first pair of arms pivotally connected at spaced points on one side of the bottom of the seat and a second pair of arms pivotally connected at spaced points on the other side of the bottom of the seat;
   forward and aft racks mounted for reciprocal movement on said base, said racks each having an open threaded groove lengthwise thereof and each of said racks having a pivotal connection to one of said first pair of arms and one of said second pair of arms;
   screw means disposed in meshing engagement with each of said threaded grooves; and
   drive means operably connected to the screw means.

7. The combination of claim 6 wherein the screw means comprises at least one helically threaded shaft and further including means mounting said shaft for pivotal movement about an axis transverse to the threaded groove whereby the shaft can be disengaged from the threaded groove.

8. The adjustable chair of claim 7 and further including;
   a third rack having an open threaded groove secured to the base;
   a pair of spaced apart parallel rails mounted on said base;
   a platform;
   roller means carried by the platform and disposed for engagement with the said rails to accommodate forward and aft movement of the chair; and
   forward and aft screw means meshing with the threaded groove of said third rack and operably connected to the said drive means.

9. The chair of claim 8 and further means mounting the forward and aft screw means for pivotal movement about an axis transverse to the threaded groove of the third rack.

10. An adjustable chair having in combination;
    a base;
    a chair frame having a bottom;
    screw jack means disposed between said base and the bottom of said frame, said means including a reciprocally movable rack mounted on the base,
    a plurality of supporting members pivotally interconnecting the rack and the frame, and
    worm means meshed with the rack;
    means mounting said worm for rotation about its own longitudinal axis and said mounting means being pivotally connected to the said base for movement about an axis transverse to the axis of rotation of the worm; and
    drive means operably connected to the worm.

11. The chair of claim 10 and further comprising;
    a tension spring interconnecting the base and the said rack in operation parallel with the screw.

12. An adjustable chair having in combination;
    a base;
    a chair frame having a bottom;
    screw jack means disposed between said base and the botto of said frame, said means including a reciprocally movable rack mounted on the base,
    a plurality of supporting members pivotally interconnecting the rack and the frame, and
    worm means meshed with the rack;
    means mounting said worm for rotation about its own longitudinal axis and said means being movably connected to the base to permit the worm means to be disengaged from the rack; and
    drive means operably connected to the worm.

13. The chair of claim 12 and further comprising;
    a tension spring interconnecting the base and the said rack in operation parallel with the screw.

14. An adjustable seat comprising in combination;
a seat frame including a bottom and an attached back rest;
a movable base, forming a carriage;
screw jack means interconnecting the carriage and the seat frame, said jack means having
fore and aft actuators having reciprocal horizontal movement and having an open threaded groove;
worm drive means positioned for engagement with the threaded groove of the actuators and pivotally connected to the carriage; and
drive means operably connected to the worm drive means.

References Cited
UNITED STATES PATENTS

| | | | |
|---|---|---|---|
| 1,762,046 | 6/1930 | Blumenberg | 248—421 |
| 3,006,594 | 10/1961 | Gruendler | 248—419 X |
| 3,013,763 | 12/1961 | Weberman | 248—429 |
| 3,167,297 | 1/1965 | Lohr | 248—419 |
| 3,188,044 | 6/1965 | Epple | 248—419 |

CHANCELLOR E. HARRIS, *Primary Examiner.*

CLAUDE A. LE ROY, *Examiner.*

R. P. SEITTER, *Assistant Examiner.*